US008296060B2

(12) United States Patent
Fetzmann et al.

(10) Patent No.: US 8,296,060 B2
(45) Date of Patent: Oct. 23, 2012

(54) METHOD AND DEVICE FOR ASSISTING IN THE NAVIGATION OF AN AIRPLANE ON THE GROUND AT AN AIRPORT

(75) Inventors: Fabien Fetzmann, Cugnaux (FR); Pierre Coldefy, Toulouse (FR); Isabelle La Vielle, Balma (FR); Nicolas Gros, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 846 days.

(21) Appl. No.: 11/758,345

(22) Filed: Jun. 5, 2007

(65) Prior Publication Data

US 2007/0299597 A1 Dec. 27, 2007

(30) Foreign Application Priority Data

Jun. 6, 2006 (FR) ..................................... 06 04988

(51) Int. Cl.
*G01C 21/34* (2006.01)

(52) U.S. Cl. ........ 701/416; 701/122; 701/411; 701/413; 701/418; 701/533

(58) Field of Classification Search .................. 701/120, 701/1, 117, 16, 207, 208, 3, 301, 533, 121, 701/122, 400, 408, 410, 411, 413, 416, 418, 701/425; 340/945, 958, 961, 971, 972; 345/619, 345/660

See application file for complete search history.

(56) References Cited

U.S. PATENT DOCUMENTS

| | | | | |
|---|---|---|---|---|
| 5,220,507 | A * | 6/1993 | Kirson | 701/533 |
| 6,456,934 | B1 * | 9/2002 | Matsunaga et al. | 701/418 |
| 6,571,166 | B1 * | 5/2003 | Johnson et al. | 701/120 |
| 2002/0003592 | A1 * | 1/2002 | Hett et al. | 349/58 |
| 2002/0120392 | A1 * | 8/2002 | Stratton et al. | 701/120 |
| 2004/0006412 | A1 * | 1/2004 | Doose et al. | 701/10 |
| 2008/0042880 | A1 * | 2/2008 | Ramaiah et al. | 340/958 |

FOREIGN PATENT DOCUMENTS

| | | |
|---|---|---|
| JP | 2004177316 | 6/2004 |
| WO | 03071228 | 8/2003 |

OTHER PUBLICATIONS

Hooey et al.; Integrating Datalink and Cockpit Display Technologies Into Current and Future Taxi Operations; Proceedings of the 19th Digital Avionics Systems Conference; 2000; p. 7.D.2-1 to 7.D.2-8; vol. 2.*

Preliminary Search Report dated Jan. 19, 2007 with English translation.

* cited by examiner

*Primary Examiner* — Khoi Tran
*Assistant Examiner* — Stephen Holwerda
(74) *Attorney, Agent, or Firm* — Dickinson Wright PLLC

(57) ABSTRACT

A method and device for assisting in the navigation of an airplane on the ground at an airport employs a display unit for automatically presenting data relating to the path to be followed by the airplane at the airport in textual form on a display screen, and a display unit for automatically presenting this data in graphic form on a display screen, using a plot illustrating said path on an airport map.

9 Claims, 3 Drawing Sheets

Figure 1:
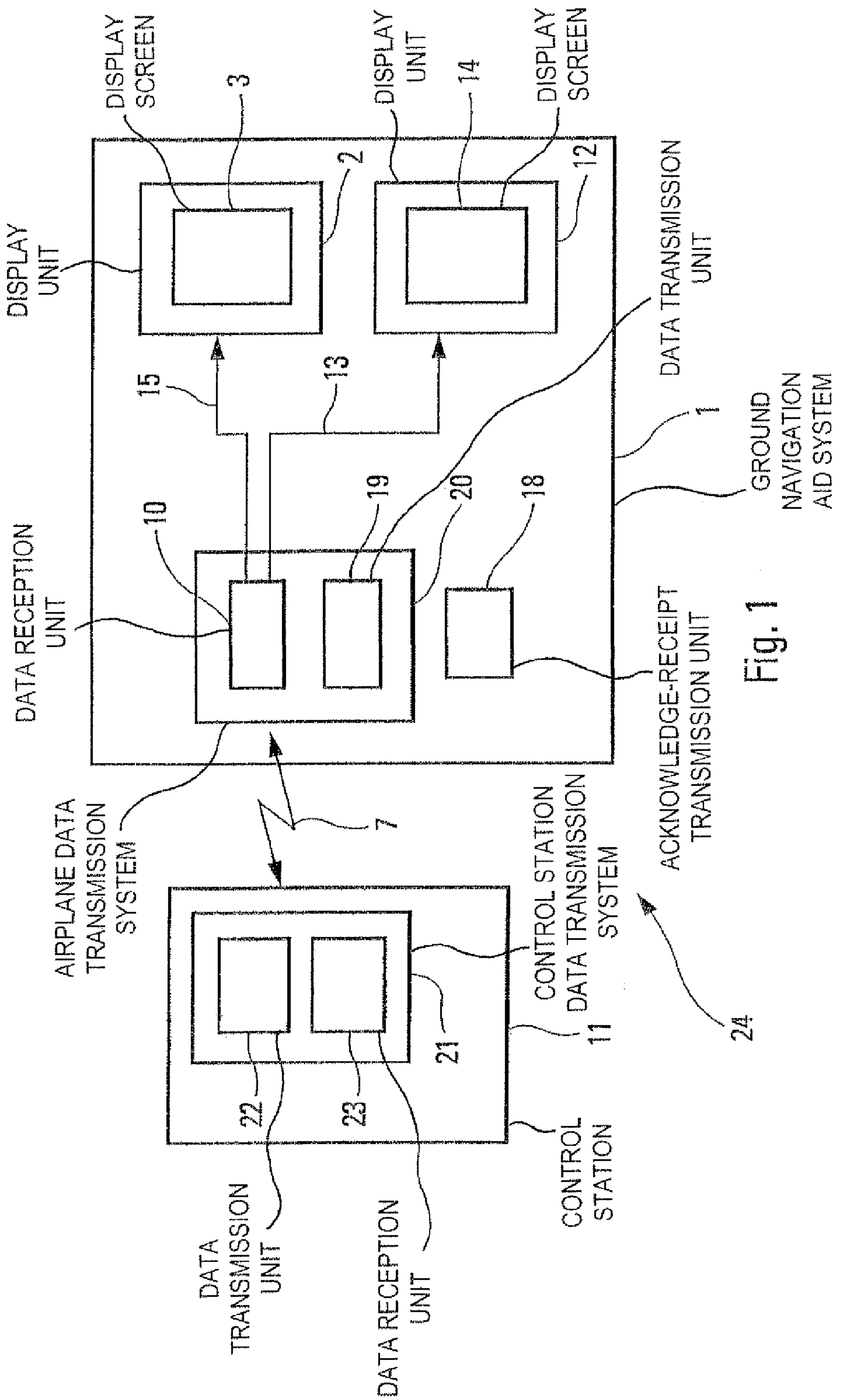

METHOD AND DEVICE FOR ASSISTING IN THE NAVIGATION OF AN AIRPLANE ON THE GROUND AT AN AIRPORT

TECHNICAL FIELD OF THE INVENTION

The present invention relates to a method and a device for assisting in the navigation of an airplane on the ground at an airport, and a system for assisting with navigation on the ground comprising such a device.

BACKGROUND OF THE INVENTION

The complexity of some airports, the increase in air traffic, the existence of installations that are often ill-suited to airplanes which are increasingly large and numerous, create traffic difficulties on the runways and the taxiways of the airports, often leading to extended taxiing times, sometimes more or less serious incidents, and, unfortunately, also accidents.

In this context, an increasingly high number of "runway incursions" are observed, involving situations where an unauthorized airplane penetrates onto the runway which is used at the same time in the proper way by another airplane, to land or take off. Such a runway incursion is very dangerous, since it endangers the lives of the occupants of both airplanes.

For safety reasons, it is therefore important, not to say imperative, for each pilot to be able to monitor the immediate environment of his airplane as effectively as possible and, if necessary, be informed of any runway incursion (or any risk of incursion).

An article by Beskenis, Green, Hyer and Johnson entitled "Integrated Display System for Low Visibility Landing and Surface Operations", published in the publication "NASA Langley Technical Report", July 1998, NAS/CR-1998-208446, discloses a display system which is on board an airplane, to assist the pilot of the airplane with ground maneuvers. To this end, this display system comprises, in particular, display means for presenting on a screen mounted in the cockpit of the airplane, a map of the airport showing the runways, the taxiways and the various buildings, and the position of the airplane and the traffic that exists at that airport.

This display system therefore implements an airport navigation function which makes it possible to locate the position of the airplane on an electronic airport map.

When navigating on the ground, air traffic controllers normally transmit to the pilot of the aircraft, orally, via a radio transmission, a succession of way points (names of taxiways and/or runways, etc.). This information helps the pilot guide the airplane at the airport. However, in the abovementioned situation, the pilot needs to himself ensure the correlation between the information transmitted by the air traffic controllers and the onboard electronic map, on which are displayed the plan of the airport and the position of his airplane. This results in a major workload for the pilot and makes the airport navigation system open to errors of interpretation or of understanding of the oral information received.

Moreover, the frequencies, normally of VHF (Very High Frequency) type, which are used for the voice communications are often saturated, particularly at complex airports, which limits the controllers in their capacity to manage all the movements of the airplanes on the ground.

Furthermore, there are also problems of understanding and interpretation in such voice communications, particularly for the following reasons: disturbed transmission or poor reception, inability to understand (accent of the speaker, speed and/or clarity of speech), impossibility of having the information repeated on large airports, verbal phraseology not respected, etc.

SUMMARY OF THE INVENTION

The present invention relates to a method for assisting in the navigation of an airplane on the ground at an airport, which makes it possible to remedy the abovementioned drawbacks.

To this end, according to the invention, said method whereby there is displayed on at least one first display screen a set of indications comprising at least:

- an airport map which at least partially represents the airport; and
- an airplane symbol which illustrates the current position of the airplane at the airport and which is displayed on said airport map, is noteworthy in that the following operations are also carried out:

- data is received, via a data transmission link, which is generated by a control station of the airport and which relates to a path to be followed by the airplane at said airport;
- said received data is presented automatically, in textual form, on at least one second display screen; and
- this received data is presented automatically, in graphic form, on said first display screen, and this using a plot illustrating said path to be followed by the airplane on said airport map.

Thus, with the invention, a data transmission link is used, of the standard "datalink" type (which is normally already provided between an airplane located at an airport and a control station of that airport, but not for the same use), to receive the information required to guide the airplane on the ground at the airport. This data is received automatically and presented automatically on said first and second display screens. This automatic implementation obviously greatly reduces the workload of the pilot.

Also, said data is presented in different forms (textual form, graphic form) on the display screens, which increases the understanding and control of the ground guidance information supplied, as detailed below. The present invention also makes it possible to remedy the various abovementioned drawbacks that can exist in voice communications.

Advantageously, the width of said plot illustrating the path to be followed by the airplane is proportional each time to the actual width of the taxiing route (runway, taxiway, etc.) along which said path passes, also taking into account the current scale of said first display screen on which this plot is displayed.

Furthermore, to facilitate the reading of the display provided on said first display screen, advantageously:

- received data, data accepted by the pilot, and a modification of the data received from the control station are revealed on at least one of said display screens; and/or
- the part of said plot that is located behind said airplane symbol is automatically deleted when the airplane moves along the path illustrated by this plot; and/or
- labels of the taxiing routes (runway, taxiway, etc.) via which said plot passes are shown on said first display screen, a label comprising by definition information (name, etc.) concerning the associated taxiing route. This in particular enables the pilot to easily correlate the textual information read on the second display screen with the graphic information displayed on the airport map displayed on said first display screen.

The present invention also relates to a device for assisting in the navigation of an airplane on the ground, in particular a transport airplane, at an airport.

According to the invention, said device of the type comprising at least first display means for displaying on at least one first display screen, a set of indications comprising at least:

- an airport map which at least partially represents the airport; and
- an airplane symbol which illustrates the current position of the airplane at the airport and which is displayed by said airport map, is noteworthy in that:

- said device which is on board the airplane also comprises:
  - data reception means for receiving, via a data transmission link, data that is generated by a control station of the airport and which relates to the path to be followed by the airplane at said airport; and
  - second display means for automatically presenting said data, in textual form, on at least one second display screen; and
- said first display means are designed in such a way as to automatically present this data in graphic form on said first display screen, and this using a plot illustrating on said airport map said path to be followed by the airplane.

In one particular embodiment, said device also comprises means enabling the pilot of the airplane to transmit, by voice or via a data transmission link, information to said control station to acknowledge the reception of data received via said data reception means.

Furthermore, advantageously, said device also comprises means, in particular data transmission means, enabling a pilot of the airplane to make a request for information to said control station, via said data transmission link. Thus, the pilot can dialog directly with a controller located in said control station of the airport by using said data transmission link, that is, without using the frequency band (normally of VHF type) intended for voice interchanges. This in particular makes it possible to remedy the abovementioned saturation problems.

The present invention also relates to a system for assisting in the navigation of an airplane on the ground at an airport.

According to the invention, said system is noteworthy in that it comprises:

- a navigation aid device, such as the above-mentioned one, which is on board the airplane; and
- at least data transmission means which are arranged on a control station of the airport and which cooperate with the reception means of said navigation aid device, so as to generate said data transmission link.

BRIEF DESCRIPTION OF THE INVENTION

The figures of the appended drawing will clearly show how the invention can be implemented. In these figures, identical references denote similar items.

FIG. 1 is the block diagram of a ground navigation aid system according to the invention.

Figure 2:
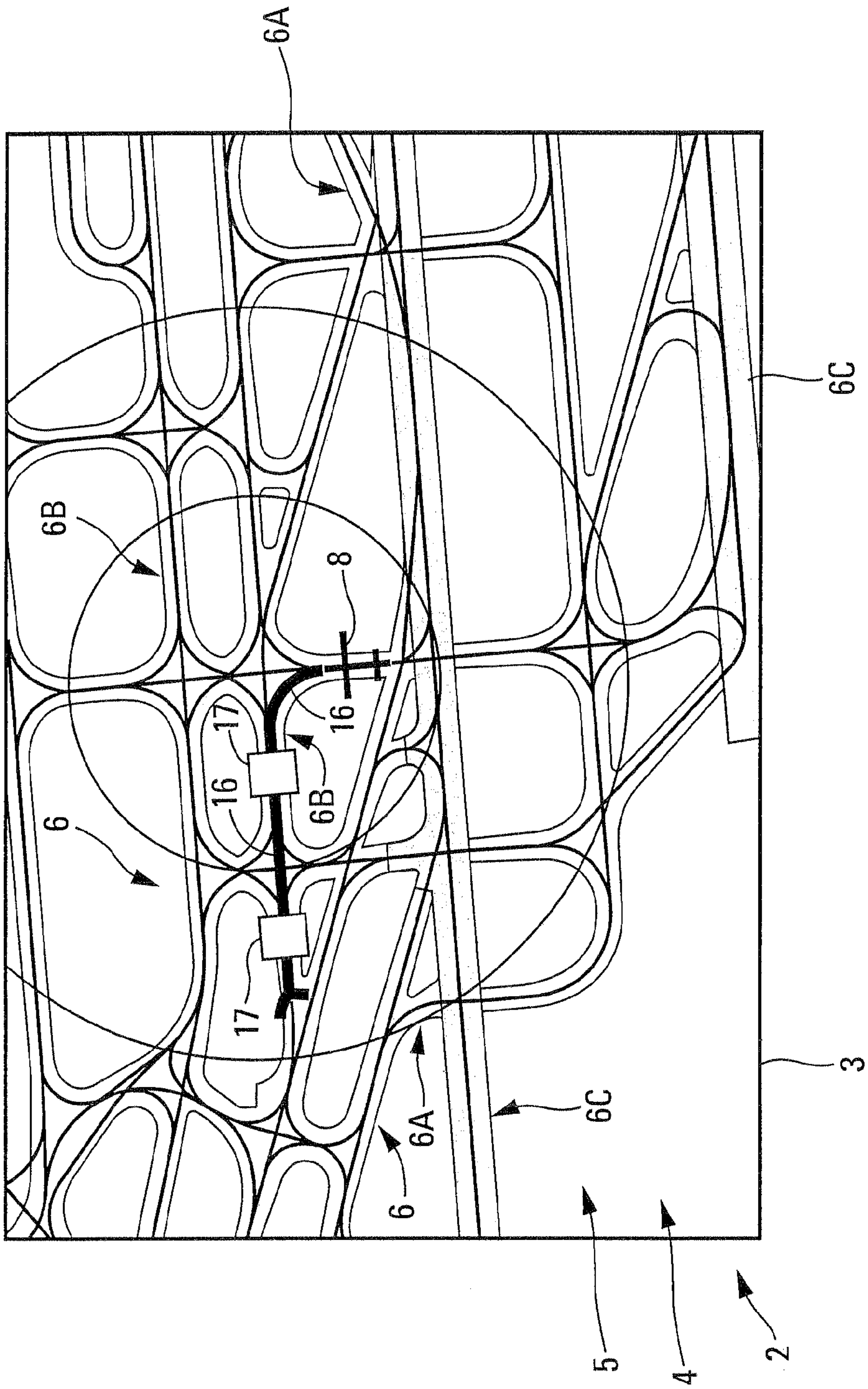
Figure 3:
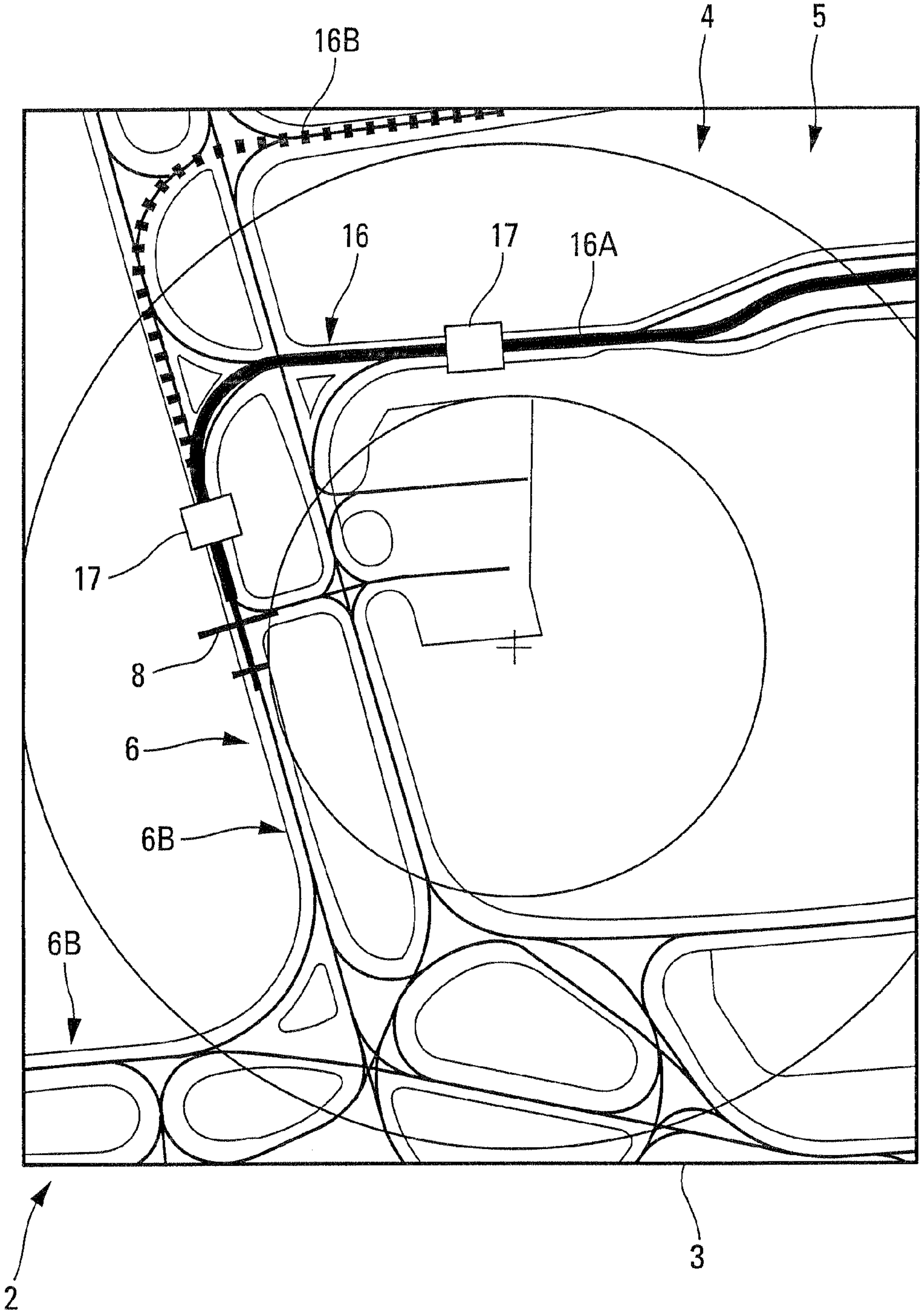

FIGS. 2 and 3 diagrammatically illustrate examples of information presentations, likely to be implemented by a device according to the present invention.

DETAILED DESCRIPTION OF THE INVENTION

The device 1 according to the invention and diagrammatically shown in FIG. 1 is intended to assist the pilot of an airplane, for example a transport airplane, when navigating said airplane on the ground at an airport.

For this, said device 1 is of the type comprising at least display means 2 which can display, on at least one display screen 3, a set of indications 4. This set of indications 4 comprises, as shown in FIGS. 2 and 3, at least:

- an airport map 5 which at least partially represents the airport at which the airplane is located and which comprises, for example, taxiing routes 6, such as feeder roads 6A, taxiways 63 and runways 6C; and
- an airplane symbol 8 which illustrates the current position of the airplane at the airport and which is displayed on said airport map 5.

Said display means 2 can be an airport navigation system of the OANS (On Board Airport Navigation System) type. In this case, the display screen 3 can be a standard navigation screen. It is known that such a standard navigation screen normally comprises various display modes, and in particular:

- a so-called "arc" mode, for which the position of the airplane is illustrated by an airplane symbol 8 which is located at the bottom of the navigation screen 3, in the middle of a number of arcs of circle provided with heading and distance scales. The airplane symbol 8 is fixed and is oriented upward. The pilot can thus easily locate his airplane on the airport map 5. The map rotates and slides according to the movement of the airplane, whose airplane symbol 8 therefore remains fixed;
- a so-called "rose" mode, for which the symbol of the airplane 8 is located in the middle of the navigation screen 3. It is also fixed and is also oriented upward. A number of concentric circles provide reference scales for rapidly and visually measuring the distances and the heading; and
- a so-called "plan" mode, as represented in FIGS. 2 and 3, which corresponds to a view of the airport from above, oriented northward. The airplane moves on this map 5 (which is fixed, but which can be shifted manually by the pilot).

According to the invention, said device 1 which is on board the airplane, comprises, in addition to said display means 2:

- data reception means 10 which can receive, via a data transmission link 7 of the "datalink" type, data that is generated at a control station 11 of the airport and which relates to the path to be followed by the airplane at said airport. These data reception means 10 receive and process the data received via the data transmission link 7, which comprises a standard transmission link by electromagnetic waves. Said data reception means 10 can be part of an air traffic management unit of ATSU (Air Traffic Services Unit) type; and
- auxiliary display means 12 which are linked via a link 13 to said means 10 and which are designed to automatically present the data received by said means 10 on at least one display screen 14. This data is presented in textual form on this display screen 14, which corresponds, for example, to a data link display and control unit of DCDU (Datalink Control and Display Unit) type.

Also, according to the invention, said display means 2 are linked via a link 15 to said means 10 and are designed to automatically present the data relating to the path to be followed by the airplane, received from said means 10, on said display screen 3, and this graphically. More specifically, said display means 2 display the path to be followed by the airplane using a plot 16 on said airport map 5, as represented in FIGS. 2 and 3.

Thus, the device 1 according to the invention uses a data transmission link 7, of standard "datalink" type, which is normally already provided between an airplane and a control station 11 of an airport, but not for the same use as here. Said device 1 in practice uses this link 7, in the context of the present invention, to receive the information needed to guide the airplane on the ground at the airport. This data is received automatically and presented automatically on said display screens 3 and 14. This automatic implementation obviously greatly reduces the workload of the pilot.

Also, said data is presented in different forms (textual form, graphic form) on the display screens 3 and 14, which increases the understanding and control of the (ground guidance) information supplied to the pilot.

Preferably, the width of said plot 16 illustrating the path to be followed by the airplane is proportional each time to the actual width of the taxiing route 6 (runway, taxiway, etc.) along which this path passes, by also taking into account the current scale of said display screen 3 on which this plot 16 is displayed.

Also, to facilitate the reading of the display provided on said display screen 3, said display means 2:

automatically delete the part of said plot 16 which is located behind said airplane symbol 8, when the airplane moves along the path illustrated by this plot 16; and show on said display screen 3 labels 17 of the taxiing route 6 (runway, taxiway, etc.) via which said plot 16 passes. By definition, a label 17 comprises information (name, etc.) concerning the associated taxiing route 6. This display in particular enables the pilot to easily correlate the textual information read on the display screen 14 with the graphic information displayed on the airport map 5 displayed on said display screen 3. These labels can, for example, be shown by doubling the size of the labels 17 or by modifying their color.

Moreover, in a particular embodiment, said device 1 also comprises means 18 that enable a pilot of the airplane to transmit, by voice or via a data transmission link, information to said control station 11 in order to acknowledge receipt of data received via said data reception means 10, such a response procedure being mandatory.

Furthermore, said device 1 also comprises means, in particular data transmission means 19, which enable a pilot of the airplane to make a request for information to said control station 11, via said data transmission link 7.

These data transmission means 19 are part, with said data reception means 10, of a data transmission system 20 which is mounted on the airplane. This data transmission system 20 can cooperate with a data transmission system 21 which is installed in the control station 11 located on the ground and which also comprises data transmission means 22 and data reception means 23 of standard type. Thus, the pilot of the airplane can dialog directly with a controller located in said control station 11 of the airport (in the form of a non-vocal dialog) by using this data transmission link 7, that is without using the frequency band (normally of VHF type) usually intended for voice interchanges. This in particular makes it possible to remedy the problems of saturation of this frequency band at many airports.

Said device 1 and said system 21 installed in the control station 11 are part of a system 24 for assisting in the navigation of an airplane on the ground, according to the invention.

It will be noted that, in the context of the present invention, a plot 16 representing the path to be followed by the airplane can be rendered null and void, in particular when the pilot indicates using the means 18 that he has not received the necessary data, or when a controller changes his advice and proposes a new plot.

In the latter case, the display means 2 can simultaneously display both plots 16A and 16B, as represented in FIG. 3. The old plot 16A for example presents the normal form (or a specific form) and the new plot 16B is shown differently, for example as a broken line and/or with a different color. This old plot 16A can remain until the pilot acknowledges reception of the new plot 16B via said means 18. No later than this moment, the new plot 16B assumes its definitive form, for example a continuous green line.

It is therefore important to distinguish between an indication (or plot) that has been received (cyan line, cyan text) and an indication (or plot) that has been accepted by the pilot (green line, green text), and a change of information sent by the controller (old as solid line, new as broken line, until accepted by the pilot). There are three different graphic representations, which are defined according to a color code that exists in the cockpit, so facilitating their interpretation by the crew.

The plot supplied is an important data item, because it allows the airplane to move over a bounded distance, in accordance with the instructions from the controller. It is therefore important to graphically reinforce the end of the plot ("IC" symbol at the end of the taxiroute in FIG. 2). This limit can be at a parking area, on a taxiway, at a taxiway intersection, at the approach to a runway or even on a runway. At the approach to a runway, this takes on a particular character, since it is the final stop point before entering onto the runway. These particular stop points are indicated by a ground marking, and can also be seen on the electronic airport map in the form of symbols (transverse bars). When it comes to these particular points, it is vitally important to respect the stops, to avoid a runway incursion. The device 1 therefore helps the pilot to better represent the abovementioned limits and anticipate a stop.

Moreover, in case of a return to a voice mode, the graphic and textual information becomes obsolete. A simple command on the graphic interface can be used to cancel and delete any displayed information. If the device 1 receives a new indication from the ground, it will once again be presented on board, textually and graphically.

The invention claimed is:

1. A method for assisting in navigation of an airplane on the ground at an airport, comprising:

displaying a set of indications on a first display screen in the airplane, said set of indications comprising:

an airport map which at least partially represents the airport; and an airplane symbol which illustrates a current position of the airplane at the airport and which is displayed on said airport map;

receiving data, by a data reception unit in the airplane via a data transmission line, said data being generated by a control station of the airport and relating to a first path to be followed by the airplane at said airport;

automatically presenting the received data, in graphic form, on said first display screen, wherein the received data is presented as a first plot on said airport map of said first path to be followed by the airplane;

additionally automatically presenting said received data, in textual form, on a second display screen in the airplane, wherein said received data is presented as a textual form of said first path to be followed by the airplane on the second display screen; and rendering null and void the first path upon the following operations being carried out:

a) a pilot of the airplane indicating, by a transmit unit, that necessary has not been received, or b) the pilot of the airplane transmitting, by the transmit unit, information to said control station acknowledging receipt of data representing a new path generated by the control station, wherein the new path is represented as a second plot on the first display screen.

2. The method as claimed in claim 1, wherein a width of said first and second plot is proportional to an actual width of a taxiing route along which said path passes, taking into account the current scale of said first display screen.

3. The method as claimed in claim 1, wherein the first and second plots have ends that are graphically reinforced, and symbols illustrating stop points are presented on the airport map.

4. The method as claimed in claim 1, wherein a part of the first and second plot which is located behind said airplane symbol is deleted automatically, when the airplane moves along the path illustrated by the first and second plot.

5. The method as claimed in claim 1, wherein displayed on said first display screen, are labels of taxiing routes via which a the first and second plot passes, each label comprising information concerning a respective taxiing route.

6. A device for assisting in navigation of an airplane on the ground at an airport, comprising:

a first display unit that displays on at least one first display screen a set of indications, said set of indications comprising:

an airport map which at least partially represents the airport; and an airplane symbol which illustrates a current position of the airplane at the airport and which is displayed on said airport map;

a data reception unit that receives data via a data transmission line, said data being generated by a control station of the airport and relating to a first path to be followed by the airplane at said airport; and a second display unit comprising at least one second display screen, wherein:

said first display unit presents said received data, in graphic form, on the at least one first display screen, wherein the received data is presented as a first plot on said airport map of said first path to be followed by the airplane, and said second display unit presents said data, in textual form, on the at least one second display screen, wherein said received data is presented as a textual form of said first path to be followed by the airplane on the at least one second display screen; and a transmit unit that renders null and void the first path upon:

a) a pilot of the airplane indicating, by the transmit unit, that necessary data has not been received, or b) the pilot of the airplane transmitting information, by the transmit unit, to said control station acknowledging receipt of data representing a new path generated by the control station, wherein the new path is represented as a second plot on the first display screen.

7. The device as claimed in claim 6, further comprising a transmission device enabling the pilot of the airplane to make a request for information to said control to communicate directly with a controller located in said control station of the airport using said data transmission link.

8. A system for assisting in navigation of an airplane on the ground at an airport, comprising a navigation aid device according to claim 6; and a data transmission device arranged on the control station of the airport and which cooperates with the reception unit of said navigation aid device so as to generate said data transmission link.

9. An airplane, which comprises a device according to claim 6.

* * * * *